United States Patent

[11] 3,541,970

[72] Inventor Alexander Ross
Schenectady, New York
[21] Appl. No. 719,933
[22] Filed April 9, 1968
[45] Patented Nov. 24, 1970
[73] Assignee Alco Products, Inc.,
New York, New York
a corporation of Delaware

[54] BOLSTER STABILIZED LOCOMOTIVE TRUCK
7 Claims, 4 Drawing Figs.
[52] U.S. Cl. .................................... 105/136,
105/113, 105/197, 105/200, 105/206, 105/207,
105/208
[51] Int. Cl. .................................... B61c 3/00,
B61f 3/04, B61f 5/12
[50] Field of Search ........................... 105/182,
185, 190, 196, 197, 197D, 197B, 199, 133, 136,
189, 193, 200, 206, 207, 208

[56] References Cited
UNITED STATES PATENTS

| 450,627 | 4/1891 | Krehbiel | 105/185 |
|---|---|---|---|
| 2,434,287 | 1/1948 | Pflager | 105/190 |
| 2,573,232 | 10/1951 | Travilla et al. | 105/190 |
| 2,592,700 | 4/1952 | Jackson | 105/190 |
| 2,721,523 | 10/1955 | McIntosh et al. | 105/190 |
| 2,898,869 | 8/1959 | Zach | 105/190 |
| 2,928,358 | 3/1960 | Meyer | 105/197 |
| 3,200,771 | 8/1965 | Dobson et al. | 105/197(B)UX |
| 3,376,831 | 4/1968 | Eaton et al. | 105/197X |

Primary Examiner—Arthur L. LaPoint
Assistant Examiner—Howard Beltran
Attorney—Daniel H. Bobis ABSTRACT: A truck assembly for a self propelled railway vehicle which includes a bolster to support the vehicle superstructure on the truck frame in which the tractive effort is transmitted from the truck frame to the bolster substantially in the same or just below the horizontal plane of the axles to minimize weight transfer between the axles.

Patented Nov. 24, 1970
3,541,970
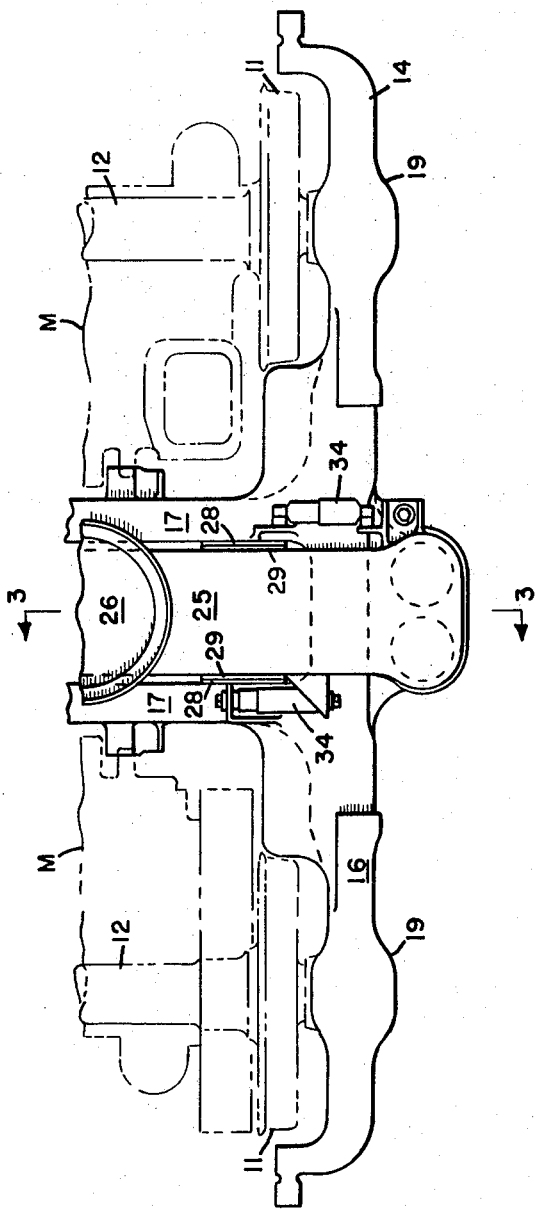
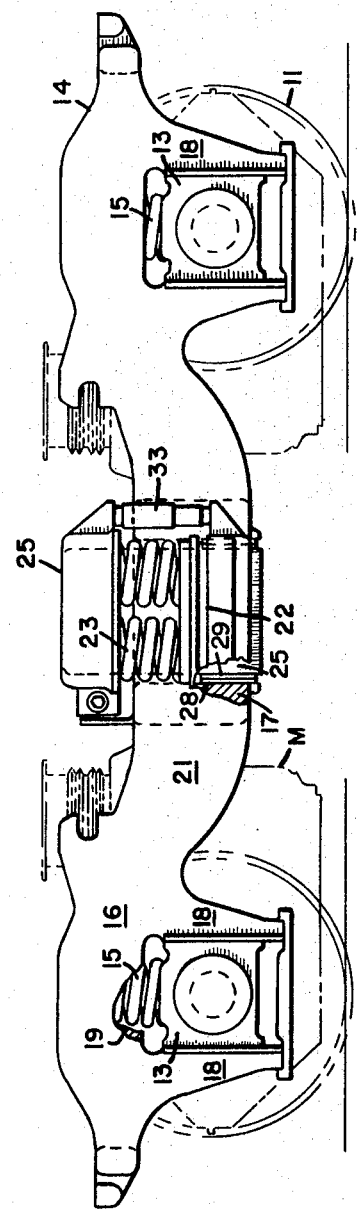
INVENTOR.
ALEXANDER ROSS

3,541,970

BOLSTER STABILIZED LOCOMOTIVE TRUCK

BACKGROUND OF THE INVENTION

A locomotive is normally constructed so that the weight on each truck is equally distributed on the respective axles and the wheels of the truck when the locomotive is stationary.

However, when the locomotive is exerting a tractive force upon an independently supported load, a part of the weight is transferred from the front axle and front wheels of each truck to the rear axle and rear wheels of the truck. The effect of this weight transfer when a high rotative force is applied to the wheels during starting and acceleration will be to cause the front wheels to slip so long as the weight remains so distributed.

Analysis during tractive effort confirms this condition and indicates that the actual weight on the truck is not changed but merely transferred from the front axle and front wheels to the rear axle and wheels by equal amounts, the front axle weighing less and the rear axle weighing more by the same amount.

Thus, it appears that during a tractive effort, power can be applied equally to all axles only so long as the lightest axle and the wheels associated therewith are achieving maximum adhesion. Thereafter, further power will cause the wheels on the lightest axle to slip during such tractive effort.

In the known prior art devices such as those shown in U.S. Pat. Nos. 2,434,287; 2,573,232; 2,592,700; 2,721,523 and 2,898,869 the force transmitting means on the bolster is approximately 12 inches above the centerline of the axles. Since these are not motor trucks and wheel slippage does not occur, the vertical location of the force transmitting means on the bolster is not important.

In the present invention, an improved truck is provided so that the respective axles on the truck and their associated wheels can be kept equally loaded and this is accomplished by a construction which applies the tractive effort at the bolster approximately at or below the centerline of the axles of the truck.

SUMMARY OF THE INVENTION

Thus, the present invention provides a locomotive truck including a truck frame, at least two or more axles on the truck frame transverse to the axial line of said frame, and at least one bolster mounted transversely of said truck frame between said axles and in the horizontal plane thereof wherein said bolster is provided with means for transmitting the tractive effort of said locomotive through cooperating wear plates between said truck frame and said bolster, the centerline of the wear plates being located on or preferably somewhat below the centerline of the axles.

The principal object of the present invention, therefore, is to provide a locomotive truck which minimizes weight unbalance between the axles in order to eliminate wheel slippage during starting or acceleration.

Another object is to provide such a locomotive truck in which the tractive effort is transmitted from the truck frame to the bolster substantially at or below the horizontal plane of the axles.

A further object of the invention is to provide a locomotive truck in which the tractive effort is transmitted through cooperating wear plates from the truck frame to the bolster, the centerline of the wear plates being located at or below the centerline of the axles.

Other and further objects of the present invention will by apparent from the following description, the accompanying drawings, and the appended claims.

BRIEF DESCRIPTION OF THE DRAWINGS

In the drawings, FIG. 1 is a top plan view of one longitudinal half of a locomotive truck constructed according to the present invention;

FIG. 2 is a side elevation of the truck shown in FIG. 1;

DESCRIPTION OF THE PREFERRED EMBODIMENT

Figure 3:
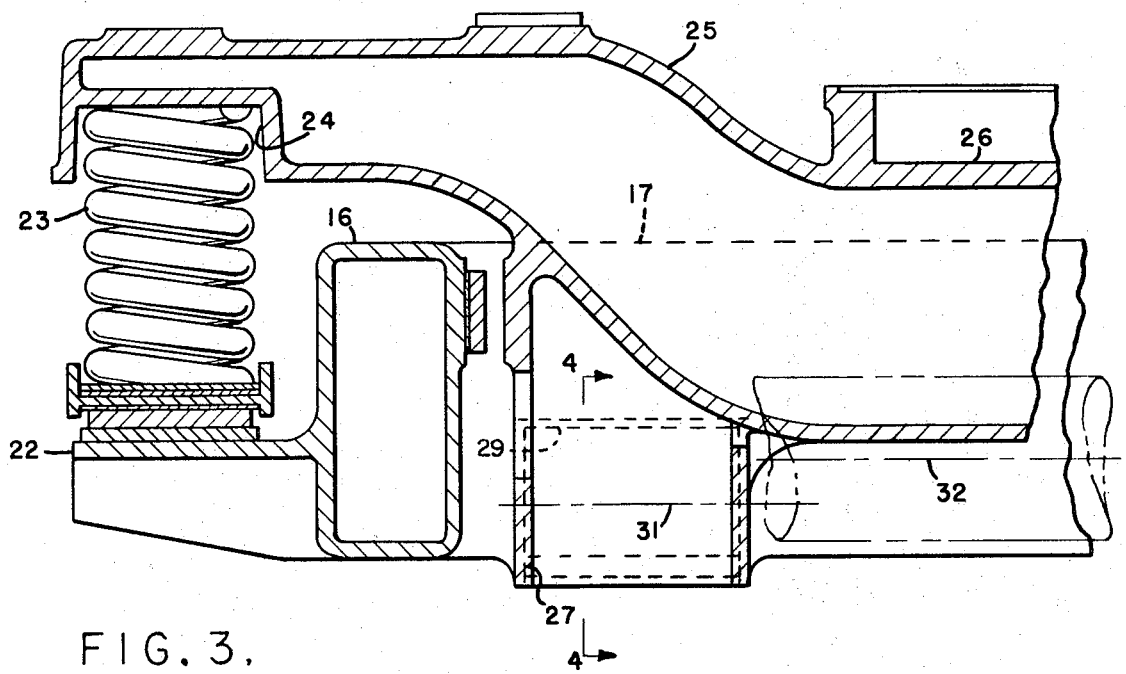
FIG. 3 is a vertical transverse section taken on line 3-3 of FIG. 1.
Figure 4:
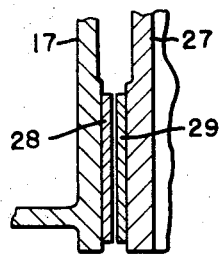
FIG. 4 is a partial sectional view taken on line 4-4 of FIG 3 showing the force transmitting elements on the bolster and transoms.

Referring now to the drawings, the truck of the present invention includes the usual wheels 11, axles 12 and journal boxes 13 rotatably mounted on the axles 12. Truck frame 14 is supported on the journal boxes 13 by coil springs 15. Conventional traction motors, generally indicated at M, are provided on the axles 12.

The truck frame 14 includes an integral pair of longitudinal side members 16 connected by transverse members 17. The ends of the side members 16 are provided with pedestals 18 to receive the journal boxes 13. The side members further include pockets 19 above the pedestals 18 to accommodate springs 15. The springs 15 are seated on the journal boxes 13 and resiliently support the frame 14 thereon.

The intermediate portion of the side members 16 adjacent the transverse members or transoms 17 is depressed at 21. An outward extension 22 on the side members 16 provides a support for bolster springs 23. Spring pockets 24 at the outer ends of the bolster 25 receive springs 23 to resiliently support the bolster 25 on extensions 22.

The bolster 25 is disposed transversely of the truck between transoms 17 and extends inwardly over the depressed portions 21 of the side members 16 and is inclined downwardly between the transoms 17. The center portion of the bolster 25 is substantially horizontal and includes a central bearing 26 to support a vehicle underframe (not shown).

As best shown in FIG. 3, the bolster includes downwardly extending sections 27 on each side of the center bearing 26. These sections 27 extend downwardly between the transoms 17 and terminate approximately at the lowest point of said transoms. Wear plates 28 and 29 are secured to opposing faces of the transoms 17 and bolster sections 27 respectively to transmit longitudinal movement of or forces between the truck frame to the bolster 25.

This vertical location of the wear plates is extremely important. As shown in FIG. 3, the centerline 31 of the wear plates 28 and 29 is slightly below the centerline 32 of the axles.

We have discovered that by locating the point of application of tractive effort in the horizontal plane of the axles weight shift or transfer is considerably reduced. This is because the weight transfer is a result of a combination of the turning moments of the truck and chassis, thus altering the spring pressures which resist the moments, and, by the axle bearing reaction pressures when axle mounted motors are used. One turning moment is produced by the drawbar pull and corresponding axle box reaction and other moments are produced by the motors themselves. Axle mounted motors, when exerting tractive effort, cause a reaction force at the motor nose and an equal and opposite force at the motor suspension bearings. By lowering the point of application of the tractive effort, this moment is cancelled. Weight transfer between the axles because of these forces is thus reduced.

Snubbers 33 are vertically disposed between the ends of the bolster 25 and extensions 22, and snubbers 34 are horizontally disposed transversely of the truck between the bolster 25 and the transoms 17 to dampen vertical and transverse oscillations of the bolster 25.

In operation of a truck constructed according to the present invention, power from motors M rotates the axles 12 and moves the truck frame 14. This movement is transmitted through wear plates 28 and 29 to the bolster 25. Since these wear plates 28 and 29 are disposed in an area substantially at or below the horizontal plane of the axles, weight transfer between the axles is held to a minimum. Wheel slippage during starting or acceleration is thus greatly reduced. In the great majority of the prior art trucks, the tractive effort is transmitted to the bolster as high as 12 inches above the centerline of the axles.

The invention herein has been shown and described as applied to a four wheel truck, but the principal of the invention is equally applicable to trucks of other wheel arrangements.

I claim:
1. A railway vehicle truck comprising:
    a plurality of spaced wheel and axle assemblies;
    traction motor means respectively for each of said wheel and axle assemblies;
    a frame including laterally spaced side members and longitudinally spaced transverse members connecting said side members, said side members having integral pedestals for each axle;
    spaced journal boxes in engagement with the axles and mounted in said pedestals;
    resilient means between each of said journal boxes and the operatively associated pedestals;
    a transverse bolster extending over said side members between said transverse members;
    a center bearing on the bolster;
    means to support said bolster outwardly of said side members; and
    cooperating force transmitting means on said transverse members on said bolster, said cooperating force transmitting means located in a plane not higher than the horizontal plane of the axles.
2. In a railway vehicle according to claim 1 wherein said bolster has a downwardly projecting portion thereon between said transverse members, and the force transmitting means on the bolster is on said downwardly projecting portion.
3. A railway truck, according to claim 2, in which the cooperating force transmitting means comprises wear plates on each side of the downwardly projecting portions of the bolster and cooperating wear plates on the transoms.
4. A railway truck, according to claim 3, in which the cooperating force transmitting means are so positioned that the center line thereof is below the center line of the axles.
5. A railway vehicle truck comprising:
    a pair of spaced wheel and axle assemblies;
    traction motor means respectively for each of said wheel and axle assemblies;
    a frame including laterally spaced side members and longitudinally spaced transverse members connecting said side members, the mid portion of each of said side members having an outwardly extending flange;
    integral pedestals on each end of said side members;
    spaced journal boxes in engagement with the axles and mounted in said pedestals;
    coil springs between each of said journal boxes and the pedestals; bolster spring means operatively mounted on each side of the truck and said spring means having one end in engagement with an associated side member flange;
    a transverse bolster extending over said side members between said transverse members and supported on the ends of the bolster spring means remote from the side member flange connected end thereof;
    a center bearing on the bolster; and
    cooperating force transmitting means on said transverse members and on said bolster, said cooperating force transmitting means being so arranged that the center line thereof is in a plane below the center line of the axles.
6. In a railway vehicle according to claim 5 wherein said bolster has a downwardly projecting portion thereon between said transverse members, and the force transmitting means on the bolster is on said downwardly projecting portion.
7. A railway truck, according to claim 6, in which the cooperating force transmitting means comprises a wear plate on each side of the downwardly projecting portions of the bolster and cooperating wear plates on the transoms.